United States Patent [19]

Buma

[11] Patent Number: 4,773,635
[45] Date of Patent: * Sep. 27, 1988

[54] SUSPENSION FOR VEHICLE

[75] Inventor: Shuuichi Buma, Toyota, Japan

[73] Assignee: Toyota Jidosha Kabushiki Kaisha, Toyota, Japan

[*] Notice: The portion of the term of this patent subsequent to Mar. 32, 2004 has been disclaimed.

[21] Appl. No.: 51,195

[22] Filed: May 18, 1987

Related U.S. Application Data

[63] Continuation of Ser. No. 784,995, Oct. 7, 1985, abandoned.

[30] Foreign Application Priority Data

Nov. 27, 1984 [JP] Japan .................. 59-248720

[51] Int. Cl.[4] .................. F16F 13/00; F16F 9/34
[52] U.S. Cl. .................. 267/220; 188/299; 188/319; 267/225; 267/35; 267/64.27; 267/140.1; 280/710; 280/712; 280/714
[58] Field of Search .................. 188/299, 319, 321.11; 267/35, 64.27, 140.1, 220, 221, 225; 280/710, 712, 714

[56] References Cited

U.S. PATENT DOCUMENTS

| | | | |
|---|---|---|---|
| 2,417,096 | 3/1947 | Thiry | 267/140.1 |
| 3,376,032 | 4/1968 | Schmid | 267/8 R |
| 3,559,776 | 2/1971 | Schultze | 188/319 X |
| 3,573,883 | 4/1971 | Gadiou | 280/714 |
| 4,159,105 | 6/1979 | Vander Laan et al. | |
| 4,313,529 | 2/1982 | Kato et al. | 280/714 X |
| 4,325,541 | 4/1982 | Korosladanyi et al. | 267/8 R |
| 4,364,582 | 12/1982 | Takahashi et al. | 188/299 X |
| 4,534,580 | 8/1985 | Kobayashi et al. | |
| 4,635,906 | 1/1987 | Buma | 280/714 X |
| 4,653,735 | 3/1987 | Buma | 267/140.1 X |

FOREIGN PATENT DOCUMENTS

| | | | |
|---|---|---|---|
| 228071 | 7/1961 | Austria | 267/35 |
| 2401787 | 4/1979 | France | |
| 459798 | 10/1950 | Italy | 188/319 |
| 199112 | 6/1981 | Japan | |
| 186650 | 11/1982 | Japan | |
| 58-76837 | 5/1983 | Japan | |
| 65635 | 4/1984 | Japan | 267/140.4 |
| 2105438 | 3/1983 | United Kingdom | 188/321.11 |

Primary Examiner—George E. A. Halvosa
Attorney, Agent, or Firm—Oblon, Fisher, Spivak, McClelland & Maier

[57] ABSTRACT

A suspension includes a shock absorber and a bushing. A piston rod of the shock absorber has a bypass path for affording communicating between two liquid chambers partitioned by a piston inside a tube and two paths formed above the bypass path. A bushing inner tube connected to the piston rod has two paths communicating respectively to two paths in the piston rod. A bushing is disposed diametrally outside the bushing inner tube, interposed between the bushing inner tube and a car body and has two fluid chambers communicating respectively to two paths in the bushing inner tube. A valve body for adjusting the damping force of the shock absorber and the spring constant and damping force of the bushing is disposed in the piston rod.

8 Claims, 3 Drawing Sheets

SUSPENSION FOR VEHICLE

This application is a continuation of application Ser. No. 784,995, filed on Oct. 7, 1985, now abandoned.

BACKGROUND OF THE INVENTION

1. Field of the Invention

This invention relates to a suspension for a vehicle, and more particularly to a suspension provided with a shock absorber capable of adjusting a damping force.

2. Description of the Prior Art

When a piston rod of a shock absorber is connected to a car body, a construction is employed in which a rubber bushing is interposed between the piston rod and the car body to prevent the car body from vibration transmitted from the shock absorber. This applies also to the case of the shock absorber capable of adjusting the damping force.

The bushing cannot change the spring constant after the shape or the like is defined as predetermined to be incorporated in the car body, except for few examples (for example, Japanese Utility Model Public Disclosure (KOKAI) No. 76837/83, since the spring constant is absolutely determined.

U.S. patent application Ser. No. 753,785 (filed July 11, 1985, now U.S. Pat. No. 4,651,977) relates to a construction for connecting a shock absorber having a piston rod to a car body. In this construction, the bushing disposed radially outward of a valve base connected to the piston rod has a plurality of fluid chambers. Communication between a plurality of the fluid chambers is afforded and interrupted by a valve body disposed in the valve base. However, the damping force of the shock absorber cannot be adjusted.

SUMMARY OF THE INVENTION

Since the bushing is set to harden the spring characteristic in consideration of controllability, when a suspension is provided with a shock absorber having a changeable damping force, the bushing itself is not softened even if the damping force is softened. Therefore, shock cannot be attenuated to a minute valve. On the contrary, since the set hardness of the bushing is limited by itself even if the damping force is hardened, the adjusting range of controllability is narrowed.

In the insulation construction disclosed in said Japanese Utility Model Public Disclosure, a first fluid chamber is defined by the bushing and a plate member and a second fluid chamber is defined by a diaphragm disposed on the opposite side of the plate member to the bushing and the plate member, both fluid chambers communicating to each other through an orifice and being filled with fluid. Even if the shock absorber is connected to the car body through the insulation construction, the same result as the above mentioned is obtained, since the insulation construction cannot change manually or automatically the spring constant of the bushing from the outside.

An object of the present invention is to provide a suspension for a vehicle in which the damping force of a shock absorber and the spring constant and damping force of a bushing can be manually or automatically adjusted.

A further object of the present invention is to provide a suspension for a vehicle in which the damping force of a shock absorber and the spring constant and damping force of a bushing can be adjusted by a single means.

The suspension for a vehicle according to the present invention comprises a shock absorber having a piston rod and capable of adjusting the damping force, a bushing interposed between said piston rod of the shock absorber and a car body and capable of adjusting the spring constant and damping force, a valve body disposed in said piston rod for adjusting the damping force of said shock absorber and the spring constant and damping force of said bushing and a means for operating said valve body.

According to the present invention, the damping force of the shock absorber and the spring constant and damping force of the bushing can be adjusted from the outside so that the synthetic damping force and spring characteristic of the suspension can be optimized to improve a ride comfort and controllability.

Since the damping force of the shock absorber and the spring constant and damping force of the bushing can be adjusted by the identical operating means, the quantity of the operating means can be reduced and the cost and weight can be reduced.

Since the valve body is disposed in the piston rod, any particularly large space is not needed for installing the suspension and the whole suspension can be designed compact.

The suspension may be automatically controlled on the basis of signals from various sensors to control antirolling, antidiving, antisquatting and problems so that better riding comfort and improved controllability can be provided to improve the performance of a vehicle.

Other objects and features of the present invention will become apparent from the following description of preferred embodiments of the invention with reference to the accompanying drawings.

DESCRIPTION OF THE PREFERRED EMBODIMENTS

Figure 1:
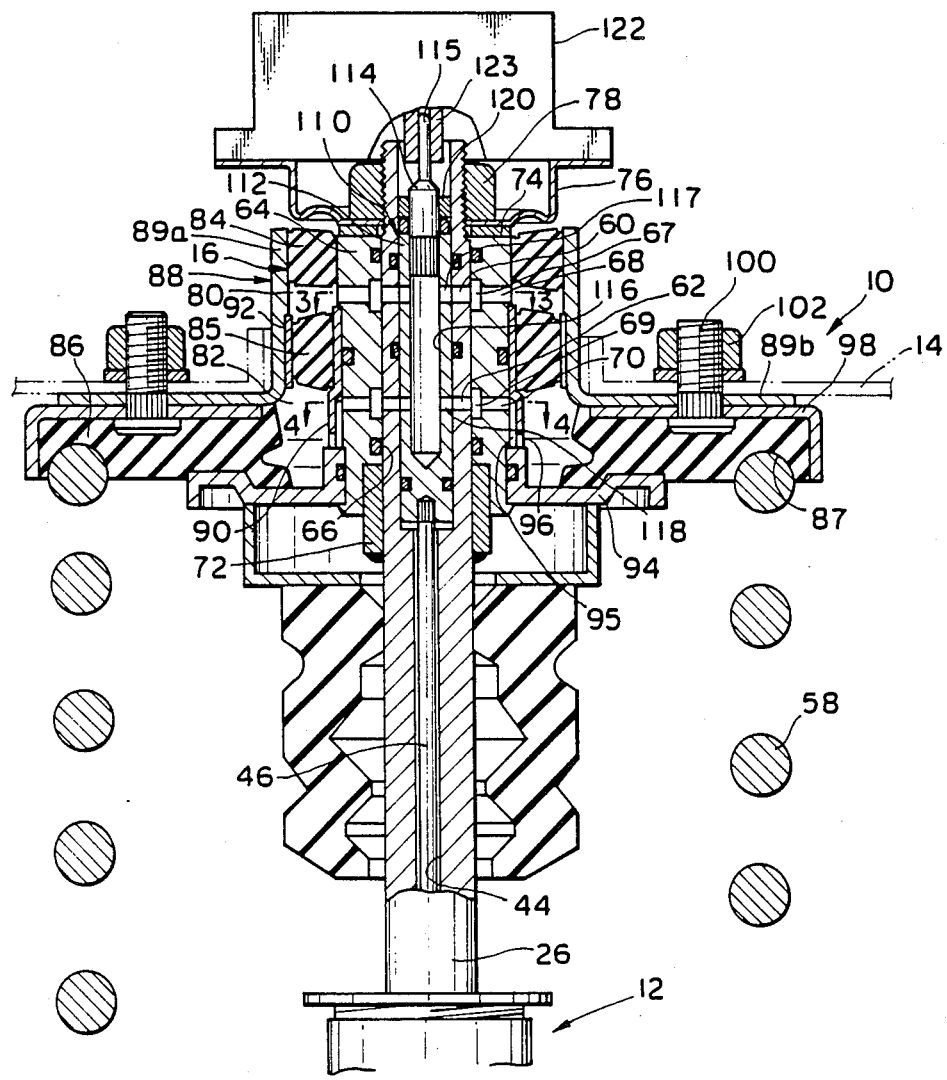
FIG. 1 is a sectional view showing principal parts of a suspension according to the present invention.

As shown in FIG. 1, a suspension 10 comprises a shock absorber 12 and a bushing 16 interposed between the shock absorber 12 and a car body 14.

Figure 2:
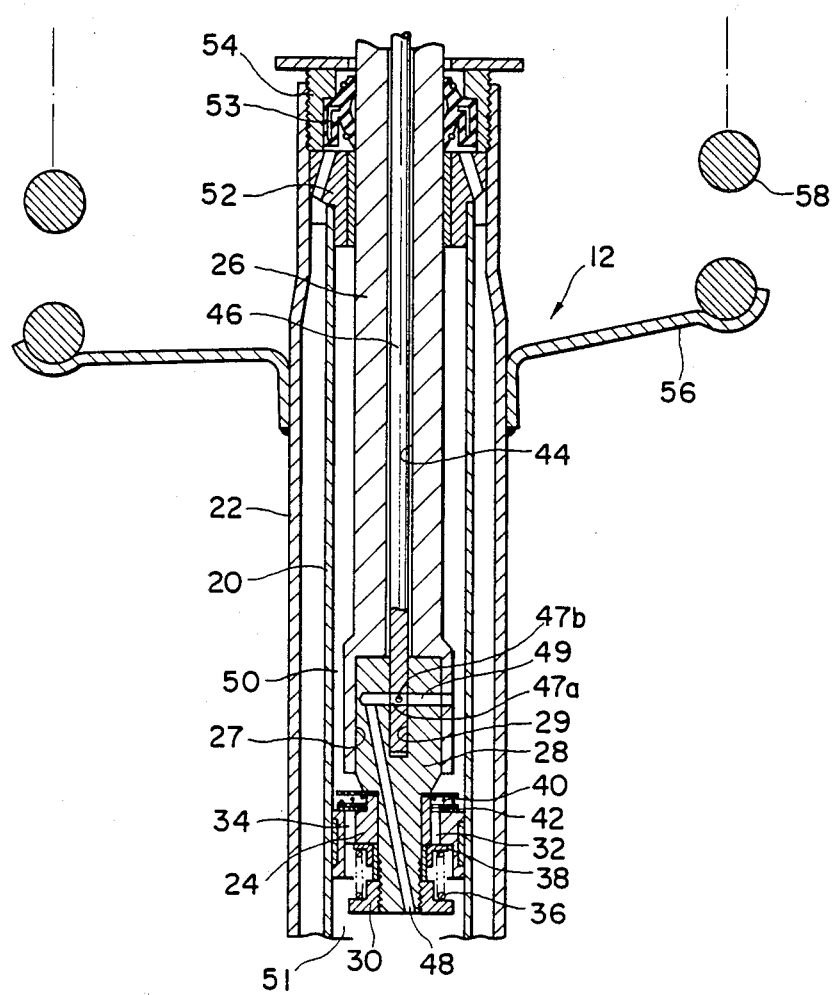
FIG. 2 is a sectional view showing principal parts of a shock absorber.

In an embodiment shown in FIG. 2, the shock absorber 12 is of a so-called twin tube type provided with an inner tube 20 and an outer tube 22 disposed spaced from the inner tube. In addition, a so-called monotube type consisting of only a single tube may be used for the shock absorber 12.

A piston 24 is slidably disposed inside the inner tube 20. In the embodiment shown, a piston rod 26 has in a lower end a bored hole 27 in which a connecting member 28 is press fitted. The connecting member 28 extends through the piston rod 26 and has the end screwed in a nut 30 to connect the piston rod 26 to the piston 24 through the connecting member 28.

The piston 24 has a plurality of ports 32 (one is shown) through which liquid flows in the extension of the piston rod 26 and which are provided circumferentially spaced from each other and a plurality of ports 34 (one is shown) through which liquid flows in the contraction of the piston rod and which provided circumferentially spaced from each other. A valve body 38 biased by a spring 36 is disposed below the ports 32. A valve body 42 biased by a spring 40 is disposed above the ports 34.

The piston rod 26 is provided with a hole 44 extending from an upper end face to a lower end face. A control rod portion 46 of a valve body kept by an O-ring (not shown) under the liquid-tight condition is rotatably disposed in the hole 44. The lower end of the control rod portion 46 extends into a hole 29 aligned with the hole 44 in the connecting member 28. The end of the control rod portion 46 has a path portion 47a extending diametrally and a path portion 47b having a bore smaller than that of the path portion 47a, spaced 60° circumferentially from the path portion 47a and extending diametrally. On the other hand, the connecting member 28 is provided with a path 48 extending from the end face over the piston 24 and a path 49 extending from the path 48 diametrally to form a bypass path affording communication between an upper liquid chamber 50 and a lower liquid chamber 51 of the piston 24.

When the path portion 47a in the control rod portion communicates to the path 49, the bypass path has a large effective section, when the path portion 47b communicates to the path 49, the bypass path has a small effective section. When both path portions get out of the path 49, the bypass path is isolated. Thus, the amount of liquid flowing through the ports 32,34 provided inherently in the piston 24 is changed to adjust the damping force of the shock absorber 12.

The piston rod 26 projects to the outside through a rod guide 52, a seal member 53 and a ring nut 54 disposed on upper ends of the inner and outer tubes 20,22 and is connected to the bushing 16 as will be later described. On the other hand, the outer tube 22 is connected to a suspension arm (not shown) well known per se to support a wheel. A spring seat 56 is welded to the outer tube 22 and a coil spring 58 is disposed between the shock absorber 12 and the car body 14.

As shown in FIG. 1, a portion of the piston rod 26 disposed inward the bushing 16 is provided with paths 60,62 spaced from each other axially of the hole 44 and extending diametrally. In the embodiment shown, a bushing inner tube 64 formed of high rigidity material like iron is disposed outside the piston rod 26. While this is for the convenience of forming the bushing 16 and incorporating the bushing 16 in the piston rod 26, the bushing inner tube 64 may be dispensed with.

Figure 3:
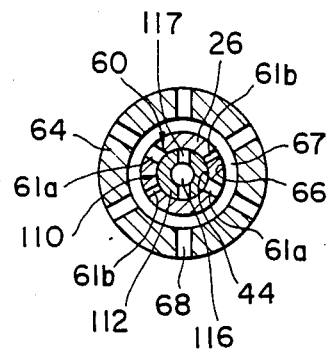
FIG. 3 is a sectional view taken along the line 3—3 in FIG. 1.

In an embodiment shown in FIG. 3, the upper path 60 consists of a pair of path portions 61a and a pair of path portions 61b spaced 60° circumferentially from the path portion 61a and having a bore smaller than that of the path portion 61a, both path portions 61a, 61b extending from the hole 44 diametrally toward an outer peripheral surface respectively. In an embodiment shown in FIG. 4, the lower path 62 consists of a pair of path portions 63a and a pair of path portions 63b having the same bore as the path portion 63a, both path portions 63a, 63b extending from the hole 44 diametrally toward the outer peripheral surface respectively. The respective path portions of the upper and lower paths 60, 62 are in the same phase relation to each other as viewed in plan.

The bushing inner tube 64 has a hole 66 through which the piston rod 26 extends, an annular groove 67 provided in a position opposed to the upper path 60 in the piston rod 26, a plurality of paths 68 (six in FIG. 3) extending diametrally from the annular groove to an outer peripheral surface, an annular groove 69 provided in a position opposed to the lower path 62 in the piston rod 26 and a plurality of paths 70 (six in FIG. 4) extending diametrally from the annular groove 69 to the outer peripheral surface.

The piston rod 26 is inserted into the hole 66 in the bushing inner tube 64. A ring 72 fixed to the piston rod abuts against a shoulder of the hole 66. A washer 74 and a bracket 76 are applied to a portion of the piston rod projecting from the bushing inner tube 64. A nut 78 is screwed onto the portion. Thus, the piston rod 26 is connected to the bushing inner tube 64. The piston rod 26 and the bushing inner tube 64 are kept liquid-tight by an O-ring disposed above the upper annular groove 67 and an O-ring disposed below the lower annular groove 69.

The bushing 16 has a first fluid chamber 80 communicating to the path 60 in the piston rod and a second fluid chamber 82 communicating to the path 62. The bushing is disposed to surround the piston rod 26. In the embodiment as shown in FIG. 1, the bushing 16 comprises first, second and third portions 84, 85 and 86 respectively formed annularly of rubber.

The first portion 84 of the bushing is vulcanized and bonded on an inside surface to an end of the bushing inner tube 64 above the path 68 in the bushing inner tube 64 and on an outside surface to an upper end of a cylindrical portion 89a of a bushing outer tube 88. The second portion 85 of bushing is vulcanized and bonded on an inside surface to a second bushing inner tube 90 and on an outside surface to a second bushing outer tube 92, respectively. The second bushing inner tube 90 of the second portion 85 is fitted in a position below the path 68 in the bushing inner tube 64 on which an O-ring is attached. The second bushing outer tube 92 is press fitted into the cylindrical portion 89a of the bushing outer tube 88. As a result, the first fluid chamber 80 is defined between the first and second portions 84, 85 of the bushing.

In the embodiment shown in FIG. 1, the second bushing inner tube 90 extends downward over the path 70 and abuts against a member 94 on its lower end. The member 94 having an O-ring attached is fitted in the bushing inner tube 64 and fixed by caulking said bushing inner tube 64. A portion of the second bushing inner tube 90 below the portion opposed to the path 70 has the diameter enlarged to form a gap 95 between itself and the bushing inner tube 64. The gap 95 communicates on one hand to the path 62 in the piston rod through the path 70 and the annular groove 69 and on the other hand to the second fluid chamber 82 through a plurality of notches 96 provided on the second bushing inner tube 90. The construction of the second bushing inner tube 90 locates conveniently itself.

The third portion 86 of the bushing is vulcanized and bonded on an upper end face to a retainer 98 and on an inner peripheral of the lower end face to the member 94, respectively. A plurality of serrated bolts 100 (two are shown in the drawing) are press fitted in the retainer 98 and these bolts 100 extend through a flanges 89b of the bushing outer tube 88 and the car body 14. A nut 102 is screwed onto each of the bolts 100 to fix the third portion 86 of the bushing to the car body 14. As a result, the second fluid chamber 82 is defined between the second and third portions 85, 86 of the bushing.

In the embodiment shown, the third portion 86 of the bushing has a recess 87 for receiving the coil spring 58 and also serves to function as an insulator of the coil spring 58.

A valve body 110 comprises first and second valve body portions 112, 114. The first valve body portion 112 has a hole 116 bored from an upper end face axially, a path 117 capable of communicating to the path 60 in the piston rod 26 and a path 118 capable of communicating to the path 62 in the piston rod 26, both paths 117, 118 being spaced axially from each other and extending diametrally from the hole 116 toward an outer peripheral surface.

The control rod portion 46 is fixedly serration fitted in a lower end of the first valve body portion 112. The second valve body portion 114 is fixedly serration fitted in a position of the hole 116 in the first valve body portion 112. The second valve body portion 114 is formed on an upper end with a flat portion 115. The valve body 110 is kept air-tight by an O-ring attached to an outer peripheral surface of the first valve body portion 112 and an O-ring abutting against an upper end of the first valve body portion. Thus, the valve body 110 is disposed rotatably in the piston rod 26. The O-ring in the upper end is held by a collar 120.

Figure 4:
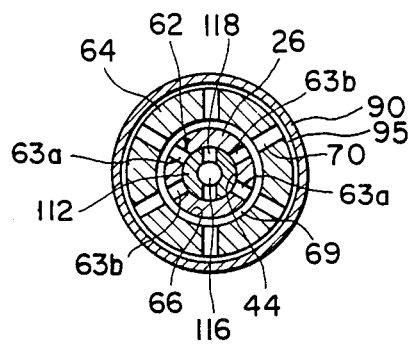
FIG. 4 is a sectional view taken along the line 4—4 in FIG. 1.

When paths 117, 118 in the valve body 110 are in the position shown in FIGS. 3 and 4 respectively, the path 60 in the piston rod is insulated from the path 62 and further the path 49 of the piston rod in the shock absorber 12 is insulated.

When the valve body 110 is rotated 60° clockwise, the path 117 and the lower path 118 are opposed respectively to a pair of the path portions 61b and a pair of the path portions 63b. Further, the small bore path portion 47b in the control rod portion 46 is opposed to the path 49 in the piston rod. As a result, the first and second fluid chambers 80, 82 communicate with each other through a small bore path and the liquid chambers 50, 51 in the shock absorber 12 communicate to each other through a small bore bypass path in addition to ports 32, 34 inherently provided in the piston 24.

When the valve body 110 is rotated 60° further clockwise, the paths 117, 118 are opposed respectively to a pair of the path portions 61a and a pair of the path portions 63a. Further, the path portion 47a in the control rod portion 46 is opposed to the path 49. Thus, the first and second fluid chambers 80, 82 communicate with each other through a large bore path and the liquid chambers 50, 51 in the shock absorber communicate to each other through a large bore bypass path.

In the embodiment shown in FIG. 1, a means 122 for operating the valve body 110 is connected to the piston rod 26 through the bracket 76. The operating means 122 comprises a motor or fluid motor and a reduction gear well known per se. The flat portion 115 of the valve body 110 is inserted into a slit provided in an output shaft 123 of the means so that the valve body 110 is rotated by the operating means 122. The operating means 122 may be manually or automatically operated on the basis of signals from various sensors.

Figure 5:
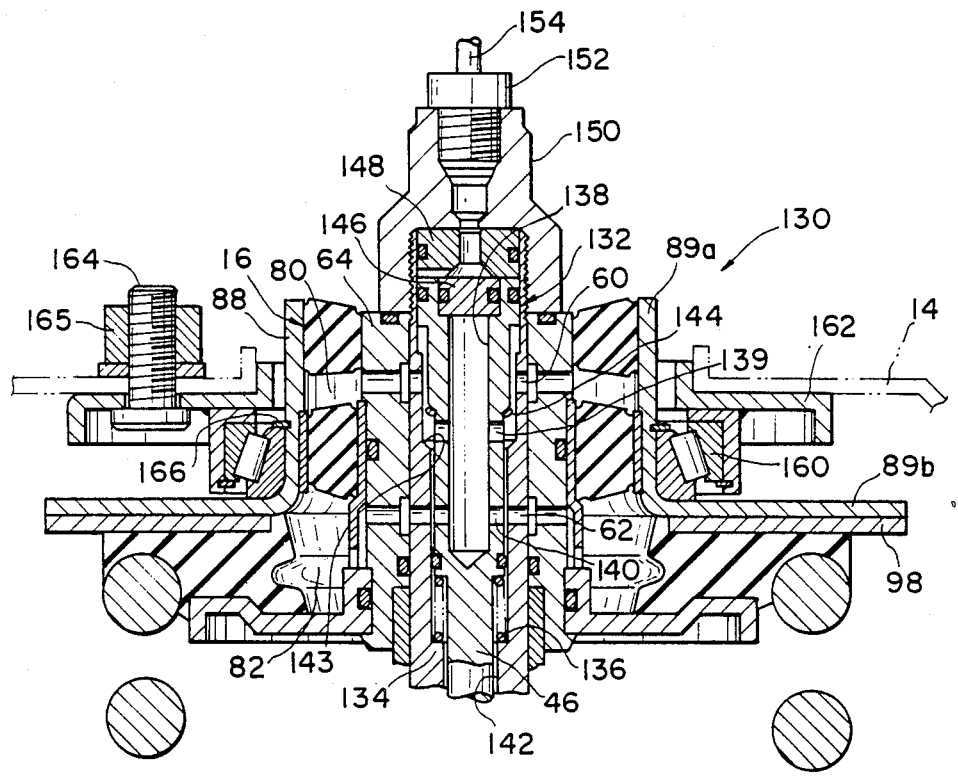
FIG. 5 is a sectional view showing principal parts of a further embodiment of the suspension.

A suspension 130 shown in FIG. 5 differs from the suspension 10 in that a valve body 132 is moved vertically to change the damping force of the shock absorber and the spring characteristic of the bushing. In the following description the same constitutional elements as those of the suspension 10 will be designated by the same symbols.

The valve body 132 used for the suspension 130 is formed as one provided integrally with the control rod portion 46 and biased upward by a coil spring 136. The shock absorber of the suspension 130 is constituted such that the control rod portion 46 has a path which is opposed to the path 49 in the piston rod 134 to make the bypass path communicate when the valve body 132 is biased upward and insulate the bypass path when the valve body 132 moves downward.

The valve body 132 has a hole 138 bored from an upper end axially and paths 139, 140 spaced axially from each other and extending from said hole diametrally. When the valve body 132 is biased upward as shown in the drawing, the path 139 is located above a shoulder 143 provided in a hole 142 in the piston rod 134. The shoulder 143 is located in the middle between the paths 60, 62 in the piston rod. On the other hand, when the valve body 132 is biased upward, the path 140 in the valve body is opposed to the path 62 in the piston rod. A seal member 144 capable of closely contacting the shoulder 143 is bonded to a position above the path 139 in the valve body 132. The seal member 144 has the size sufficient to provide a gap between itself and the hole 142 in the piston rod 134.

A plug 146 to which an O-ring is attached is forced into the hole 138 in the valve body 132. The valve body 132 is movably axially disposed in the hole 142 in the piston rod 134. A spacer 148 to which an O-ring is attached is disposed in the hole 142 in the piston rod. A box nut 150 is screwed onto the piston rod 134. Thus, the piston rod 134 is connected to the bushing inner tube 64 and the valve body 132 is held in the piston rod 134.

To the box nut 150 is connected a hose 154 by a connector 152. When pressurized fluid, for example compressed air, is introduced into the hose 154, the compressed air acts on the plug 146 through a hole in the spacer 148 to depress the valve body 132. As a result, since the path in the control rod portion 46 gets out of the path 49 in the piston rod, the path 49 is closed and at the same time the seal member 144 closely contacts the shoulder 143. Therefore, the first fluid chamber 80 is insulated from the second fluid chamber 82.

While the bushing 16 of the suspension 130 has the same constitution as that of the suspension 10. A ball and roller bearing 160 is interposed between the bushing outer tube 88 and the car body 14 in the suspension 130. Therefore, the suspension 130 is formed to be steered. To an outer race of the ball and roller bearing 160 is welded a connecting plate 162 which is connected to the car body 14 by bolts 164 and nuts 165. On the other hand, an inner race of the ball and roller bearing 160 is fitted in the bushing outer tube 88 to be held by a stop ring 166. The flange 89b of the bushing outer tube is welded to the retainer 98.

Fluid, i.e., oil and other liquid or air and other gas or mixture of liquid and gas is enclosed in the first and second fluid chambers 80, 82.

When an automobile travels, the operating means 122 is operated to rotate the valve body 110 by the manual operation of a driver or by the operation of a controller for calculating upon receiving signals from a speed sensor, an acceleration sensor, a rotational angular velocity sensor of a steering wheel and other sensors.

When the valve body 110 is in the position shown in FIG. 3, the path 49 in the piston rod 26, and further the paths 60, 62 are insulated. As a result, the damping force of the shock absorber 12 and the spring constant of the bushing 16 are both kept under the hard condition.

When the valve body 110 is rotated 60° clockwise, since the liquid chambers 50, 51 of the shock absorber 12 communicate to each other through a small bore bypass path in addition to the ports inherently provided in the piston 24, the damping force of the shock absorber 12 is of medium one. And since the first and second fluid chambers 80, 82 of the bushing 16 communicate to each other through a small bore path, the spring constant of the bushing is of the medium one and the damping force is intensified.

When the valve body 110 is rotated 60° further clockwise, the damping force of the shock absorber 12 is reduced and the spring constant and damping force of the bushing 16 is reduced.

Obviously, numerous modifications and variations of the present invention are possible in light of the above teachings. It is therefore to be understood that within the scope of the appended claims, the invention may be practiced otherwise than as specifically described herein.

I claim:

1. A suspension system for a vehicle, comprising:
   a shock absorber provided with a tube containing liquid, a piston partitioning the interior of the tube into two liquid chambers and a piston rod connected to said piston and having a bypass path for affording communication between said two liquid chambers;
   an elastic bushing interposed between said piston rod of the shock absorber and a car body and having a plurality of portions disposed axially apart from one another, the bushing being secured fixedly to said car body and having a plurality of fluid chambers which contain fluid and which are communicated with one another, each of fluid chambers being defined by two partitioning means respectively including said portions adjoined to each other;
   valve means interconnecting said plurality of fluid chambers for adjusting the spring constant and damping force of said bushing;
   a control rod disposed in said piston rod of the shock absorber to open and close said bypass path for affording and interrupting communication between said two liquid chambers; and
   means for operating said valve means and control rod simultaneously, wherein fluid flow among said fluid chambers of the bushing and liquid flow through said bypass path between said two liquid chambers of the shock absorber are controlled by said operating means such that the spring constant and damping force of said bushing and the damping force of said shock absorber is adjustable in a plurality of steps.

2. A suspension system for a vehicle as claimed in claim 1, wherein said plurality of portions of the bushing comprise first, second and third portions and said plurality of fluid chambers comprise a first and second fluid chambers.

3. A suspension system for a vehicle as claimed in claim 1, wherein said operating means is a rotary machine and said valve means and control rod are rotated by the operating means.

4. A suspension system for a vehicle, comprising:
   a shock absorber provided with a tube containing liquid, a piston partitioning the interior of the tube into two liquid chambers and a piston rod connected to said piston and having a bypass path for affording communication between said two liquid chambers;
   an elastic bushing interposed between said piston rod of the shock absorber and a car body and having a plurality of portions disposed axially apart from one another, the bushing being secured fixedly to said car body and having a plurality of fluid chambers which contain fluid and which are communicated with one another, each of fluid chambers being defined by two partitioning means respectively including said portions adjoined to each other;
   valve means interconnecting said plurality of fluid chambers for adjusting the spring constant and damping force of said bushing;
   a control rod disposed in said piston rod of the shock absorber to open and close said bypass path for affording and interrupting communication between said two liquid chambers; and
   means for operating said valve means and control rod simultaneously, wherein fluid flow among said fluid chambers of the bushing and liquid flow through said bypass path between said two liquid chambers of the shock absorber are controlled by said operating means such that a variable quantity of fluid and liquid flow respectively in a first position, a second position and a third position, and whereby the spring constant and damping force of said bushing and the damping force of said shock absorber are adjustable in three steps.

5. A suspension system for a vehicle as claimed in claim 4, wherein said plurality of fluid chambers comprises a first and second fluid chamber.

6. A suspension system for a vehicle as claimed in claim 4, wherein said operating means is a rotary machine and said valve means and control rod are rotated by the operating means.

7. A suspension system for a vehicle, comprising:
   a shock absorber provided with a tube containing liquid, a piston partitioning the interior of the tube into two liquid chambers and a piston rod connected to said piston and having a bypass path for affording communication between said two liquid chambers and two paths formed above the bypass path;
   a bushing inner tube connected to said piston rod and having two paths respectively communicating to said two paths in the piston rod;
   an elastic bushing interposed between said bushing inner tube and a car body and having three portions disposed axially apart from one another, the bushing having two fluid chambers which contain fluid and which are communicated respectively to said two paths in the bushing inner tube, each of fluid chambers being defined by two partitioning means respectively including said portions adjoined to each other;
   valve means disposed rotatably in said piston rod for adjusting the spring constant and damping force of said bushing and having a path capable of communicating to said two paths in the piston rod;
   a control rod disposed rotatably in said piston rod for adjusting the damping force of the shock absorber and having a path adapted for communication with said bypass path; and means fixed to said piston rod for rotating said valve means and control rod simultaneously, wherein fluid flow between said two fluid chambers of the bushing and liquid flow through said bypass path between said two liquid chambers of the shock absorber are controlled by said rotating means such that a variable quantity of fluid and liquid flow respectively in a first position, a second position and a third position, and whereby the spring constant and damping force of said bushing and the damping force of said shock absorber are adjustable in three steps.

8. A suspension system for a vehicle, comprising:

a shock absorber provided with a tube containing liquid, a piston partitioning the interior of the tube into two liquid chambers and a piston rod connected to said piston and having a bypass path for affording communication between said two liquid chambers and two paths formed above the bypass path;

a bushing inner tube connected to said piston rod and having two paths respectively communicating to said two paths in the piston rod;

an elastic bushing interposed between said bushing inner tube and a car body and having three portions disposed axially apart from one another, the bushing having two fluid chambers which contain fluid and which are communicated respectively to said two paths in the bushing inner tube, each of fluid chambers being defined by two partitioning means respectively including said portions adjoined to each other;

valve means disposed to move axially in said piston rod for adjusting the spring constant and damping force of said bushing and having a path capable of communicating to said two paths in the piston rod;

a control rod disposed to move axially in said piston rod for adjusting the damping force of the shock absorber and having a path adapted for communication with said bypass path; and means fixed to said piston rod for supplying fluid to move said valve means and control rod simultaneously, wherein fluid flow between said two fluid chambers of the bushing and liquid flow through said bypass path between said two liquid chambers of the shock absorber are controlled by said supplying means such that fluid and liquid flow in a first position and are ceased to flow in a second position, and whereby the spring constant and damping force of said bushing and the damping force of said shock absorber are adjustable in two steps.

* * * * *